(12) United States Patent
Buchheit et al.

(10) Patent No.: US 7,048,174 B2
(45) Date of Patent: May 23, 2006

(54) ADAPTABLE SPRING FORCE CLAMPING APPARATUS AND METHODS

(75) Inventors: Jack G. Buchheit, St. Charles, MO (US); Colleen A. Oberlee, Hazelwood, MO (US); Louis F. Murray, Eureka, MO (US)

(73) Assignee: The Boeing Company, Chicago, IL (US)

(*) Notice: Subject to any disclaimer, the term of this patent is extended or adjusted under 35 U.S.C. 154(b) by 93 days.

(21) Appl. No.: 10/648,535

(22) Filed: Aug. 25, 2003

(65) Prior Publication Data

US 2005/0045693 A1 Mar. 3, 2005

(51) Int. Cl.
*B23K 37/00* (2006.01)
*B23K 1/18* (2006.01)
*B23K 37/04* (2006.01)

(52) U.S. Cl. ............... 228/44.3; 228/49.3; 228/212
(58) Field of Classification Search ............... 228/1.1, 228/4.1, 5.5, 44.3, 47.1, 48, 49.1–49.6, 212
See application file for complete search history.

(56) References Cited

U.S. PATENT DOCUMENTS

| | | | | |
|---|---|---|---|---|
| 2,052,380 A * | 8/1936 | Chapman | ............... | 219/60 R |
| 3,712,529 A * | 1/1973 | Ozawa et al. | ............... | 228/44.3 |
| 4,492,015 A | 1/1985 | Dearman | | |
| 4,582,241 A * | 4/1986 | Johnson | ............... | 228/49.3 |
| 5,172,846 A * | 12/1992 | Hayashi et al. | ............... | 228/5.7 |
| 5,263,632 A * | 11/1993 | Zadrick et al. | ............... | 228/49.1 |
| 5,535,938 A * | 7/1996 | Leduc | ............... | 228/212 |
| 6,127,646 A * | 10/2000 | Aebersold et al. | ...... | 219/121.63 |
| 6,189,764 B1 * | 2/2001 | Hannan | ............... | 228/44.3 |
| 6,371,353 B1 * | 4/2002 | Ikeda et al. | ............... | 228/5.5 |
| 6,666,371 B1 * | 12/2003 | Nakazawa et al. | ............... | 228/212 |
| 2005/0093219 A1 * | 5/2005 | Baumann | ............... | 269/166 |

FOREIGN PATENT DOCUMENTS

| | | |
|---|---|---|
| EP | 2576371 | 7/1985 |
| FR | 1332523 | 1/1971 |
| GB | GB 2169836 A * | 7/1986 |

* cited by examiner

*Primary Examiner*—Lynne R. Edmondson
(74) *Attorney, Agent, or Firm*—Lee & Hayes, PLLC

(57) ABSTRACT

Adaptable spring force clamping apparatus and methods are disclosed. In one embodiment, an apparatus includes at least one elongated member adapted to be positioned proximate to a surface of a work piece. The elongated member includes first and second end portions adapted to be secured to substantially prevent movement of the elongated member relative to the surface. A plurality of pressure applying devices are operatively attached to the elongated member, each pressure applying device including a contact member moveable relative to the elongated member and adapted to engage the surface of the work piece, and a resilient member operatively coupled to the contact member and to the elongated member.

39 Claims, 8 Drawing Sheets

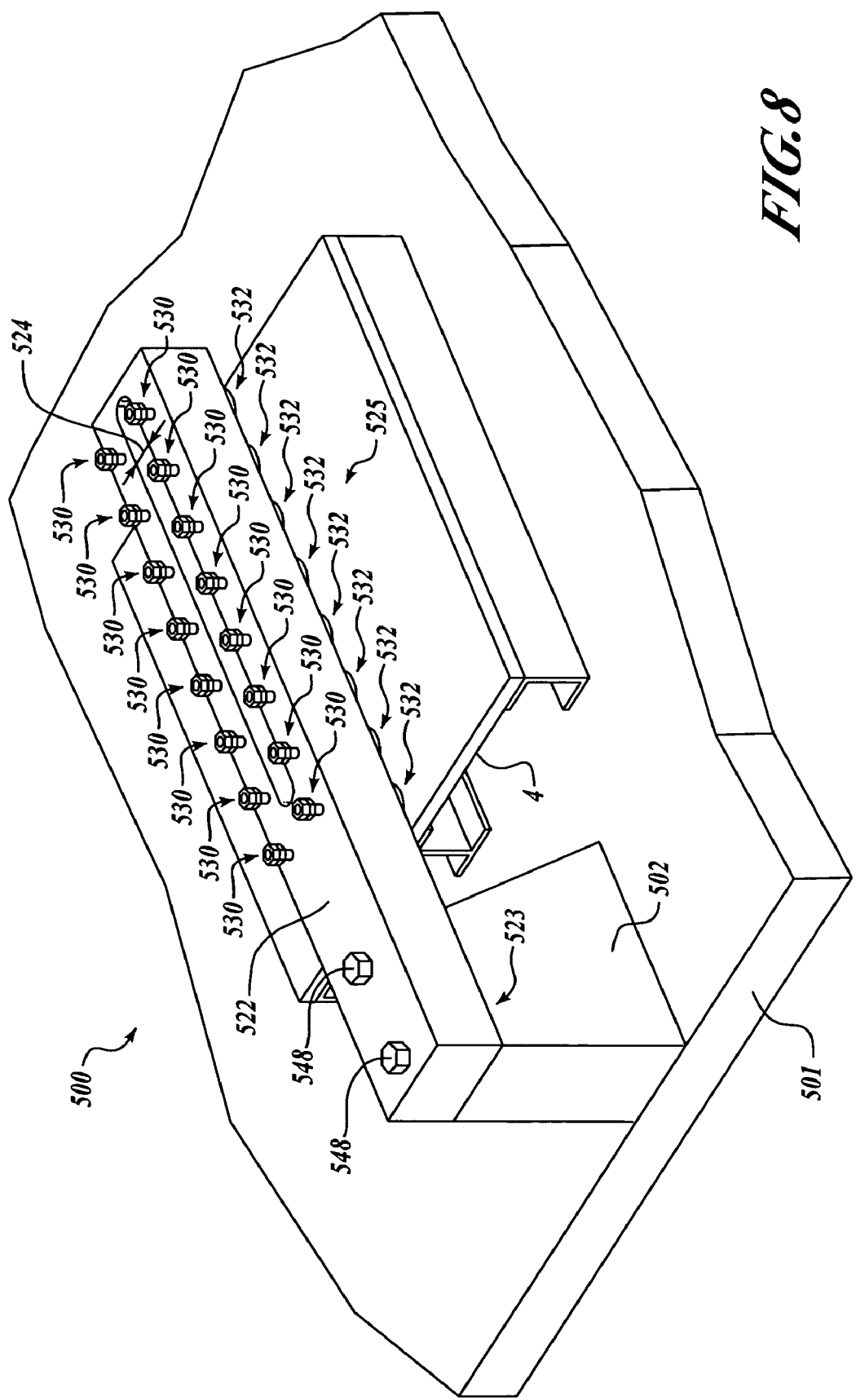

ADAPTABLE SPRING FORCE CLAMPING APPARATUS AND METHODS

GOVERNMENT LICENSE RIGHTS

This invention was made with Government support. The Government has certain rights in this invention.

FIELD OF THE INVENTION

This invention relates generally to assembly tools, and, more specifically, to clamping mechanisms.

BACKGROUND OF THE INVENTION

Equipment and vehicles, including aircraft, often utilize sheets or long sections of metal that need to be clamped together or to a frame during assembly of the equipment. Assembly may include welding or other bonding processes. Typically clamps of various configurations are utilized to hold materials in place during welding, bonding or other assembly. For example, if welding is being utilized to bond segments of skin to each other or the underlying framing, the skin segments typically are held in place during that process.

Existing clamps often span the surface being clamped, being anchored at their ends. For example, metal bars, shaped to conform to the section or surface being worked on have been utilized as clamps, by being anchored at their respective ends and held tightly against the surface being worked on. It will be appreciated that clamping a bar at its ends across a work surface results in a differential amount of pressure being applied to the work surface across the span of the bar. This occurs because the bar deflects somewhat with the application of clamping force from the ends. Typically the clamped work piece is not held as securely in the center of the span of the clamp bar as it is near the ends where the ends are anchored. In some circumstances, this differential clamping force can result in insufficient clamping force being applied to the work piece, or differential stresses in the work piece after assembly. While larger clamping bars may be utilized to reduce deflections across their span when clamped against a work piece, increased size requires increased effort to manipulate and to use in jigs and assembly modules.

Therefore, an unmet need exists for adaptable clamps that provide improved clamping of surfaces during manufacturing operations.

SUMMARY OF THE INVENTION

The present invention is directed to adaptable spring force clamping apparatus and methods. In one embodiment, an apparatus includes at least one elongated member adapted to be positioned proximate to a surface of a work piece. The elongated member includes at least one portion adapted to be secured to substantially prevent movement of the elongated member relative to the surface. A plurality of pressure applying devices are operatively attached to the elongated member and disposed therealong, each pressure applying device including a contact member moveable relative to the elongated member and adapted to engage the surface of the work piece, and a resilient member operatively coupled to the contact member and to the elongated member. The resilient member biases the contact member away from the elongated member to apply a clamping force to the surface of the work piece. In alternate embodiments, two elongated or spanning members with pressure applying devices may be mounted parallel to each other, or alternately, a single elongated or spanning member with a slot formed therein may provide access for welding or other manufacturing work in the clamped area.

In accordance with still further aspects of the invention, the apparatus of the present invention may be curved or angled. The apparatus may also be two-dimensional, such as cruciform shaped. In accordance with another aspect of the invention a clamping apparatus in accordance with the present invention is included with an assembly manufacturing jig holding the work piece. In further aspects of the invention, a method is provided for welding skin segments of an aircraft to adjoining sections or to underlying framing utilizing the clamping method of the present invention.

BRIEF DESCRIPTION OF THE DRAWINGS

The preferred and alternative embodiments of the present invention are described in detail below with reference to the following drawings.

FIG. 8 is an isometric view of a cantilevered clamp bar assembly in place on a work piece.

DETAILED DESCRIPTION OF THE INVENTION

Figure 1:
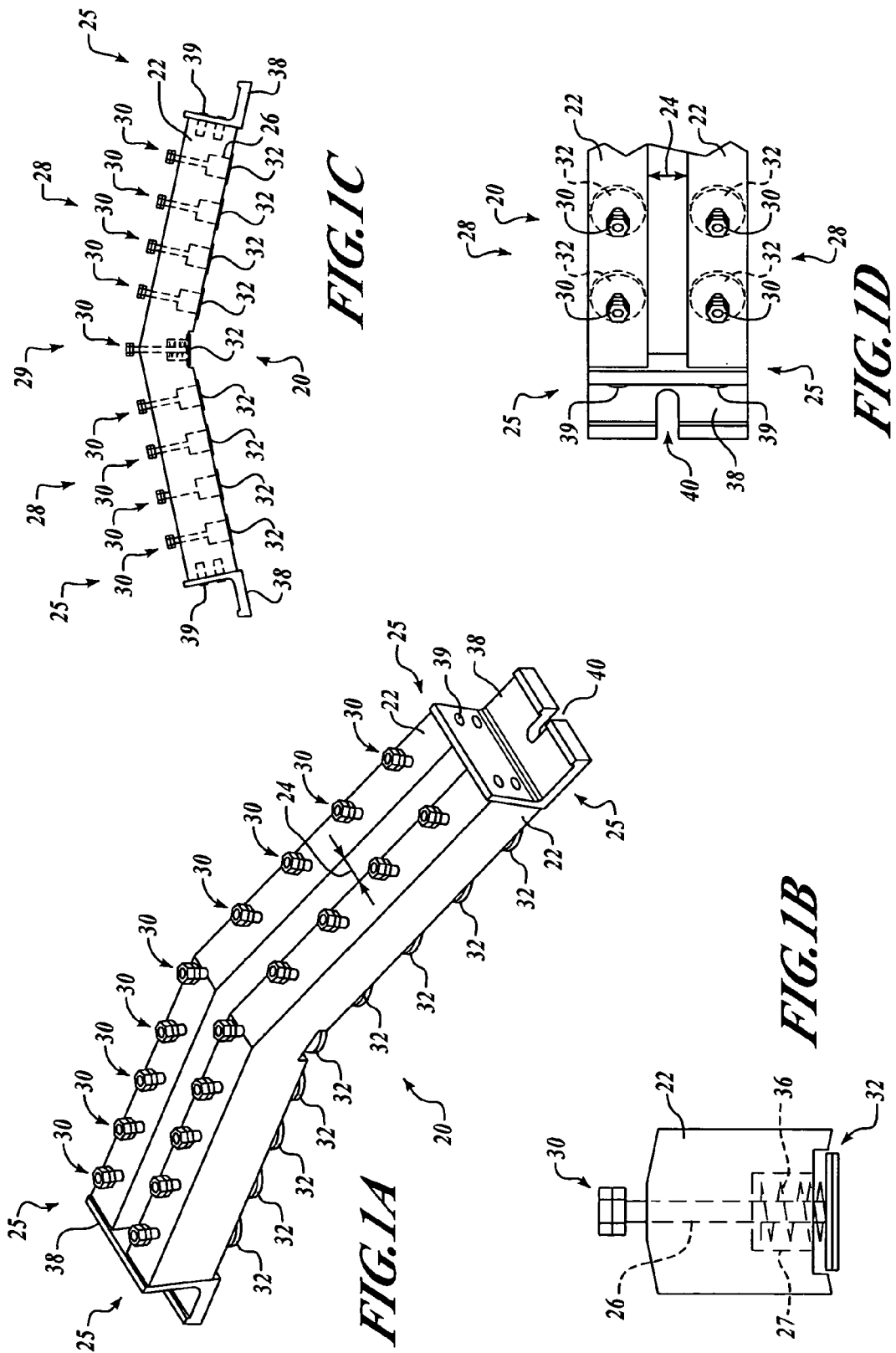
FIG. 1A is an isometric view of an angled clamp bar assembly in accordance with an embodiment of the present invention.
FIG. 1B is an end elevational view of a single clamp bar of the angled clamp bar assembly of FIG. 1A.
FIG. 1C is a side elevational view of the angled clamp bar assembly of FIG. 1A.
FIG. 1D is a partial top elevational view of the angled clamp bar assembly of FIG. 1A.

The present invention generally relates to adaptable spring force clamping apparatus and methods. Many specific details of certain embodiments of the invention are set forth in the following description and in FIGS. 1–8 to provide a thorough understanding of such embodiments. One skilled in the art, however, will understand that the present invention may have additional embodiments, or that the present invention may be practiced without several of the details described in the following description.

By way of background, in one embodiment, an apparatus includes a member arranged to at least partially span a work piece with at least one pressure applying device attached to the member. The at least one pressure applying device may include a plurality of spring-loaded pads arranged to apply pressure to a work piece. Two spanning members with pressure applying devices may be mounted parallel to each other, or a single spanning member with a slot suitably may provide access for welding or other work in the clamped area.

Turning to FIG. 1A, an exemplary angled clamp bar assembly 20 in accordance with an embodiment of the present invention is shown. The assembly 20 includes two clamp bars 22 arranged in parallel with a slot 24 between them. The clamp bars 22 in this exemplary embodiment are metal bars with a single obtuse angle bend in the middle. The clamp bars 22 may be any suitable material and cross-section that carries sufficient stress to apply a desired clamping force to a work piece. The work piece (not shown) is spanned by the clamp bars 22 with the work piece underneath or inside the angle of the clamp bars 22. In a presently preferred embodiment of the present invention, 1018 steel alloy bars 1¾"×1 ⅛" are utilized for the clamp bars 22.

The clamp bars 22 may be parallel and may be coupled together by two steel angle stock hold-downs 38 fastened to the ends of the clamp bars 22 by fasteners 39. In this embodiment, the hold-downs 38 are suitably ⅜" steel 90° angle stock with one limb of the angle stock fastened to the ends of the clamp bars 22. The hold-downs 38 thus hold the clamp bars 22 in position parallel to each other but separated by the width of the slot 24. The other limb of the hold-down 38 has an opening 40 through which a bolt or other fastener may be inserted to attach the assembly 20 over a work piece, as described more fully below. In this embodiment, there are two hold-downs 38, one at each end of the clamp bars 22. The hold-downs 38 thus hold the clamp bars 22 in position with respect to each other, and also suitably attach the entire assembly 20 in position over the work piece. It will be appreciated that the clamp bars 22 may be curved, straight, segmented, or any other desired shape. It will also be appreciated that the two clamp bars 22 and the hold-downs 38 may suitably be manufactured from one piece, or a different combination of pieces forming the assembly 20.

In this example embodiment, the clamp bars 22 have a plurality of spring-loaded pads 32 along their lengths that may apply force against the work piece. The pads 32 extend outwardly from a bottom side of the assembly 20. Both clamp bars 22 have a plurality of spring-loaded pads 32 along their lengths. The spring-loaded pads 32 are mounted on keepers 30 which project through the clamp bars 22. The keepers 30 have springs 36 or other pressure-applying devices (see FIG. 1B) mounted in counter-bored holes 27 on the bottom of the clamp bars 22, as described in more detail with reference to FIG. 1B and FIG. 2 below. The slot 24 between the clamp bars 22 allows access to the work piece between the clamp bars 22. Thus the assembly 20 allows clamping pressure to be applied by the pads 32 to the work piece while allowing access to the work piece between the clamp bars 22 through the slot 24.

While clamping pressure is applied on both sides of the slot 24 using the clamp bar assembly 20, a variety of manufacturing operations may be performed on the work piece, including, for example, welding, heat bonding, adhesive application or other bonding methods, milling, sanding, routing, riveting, drilling, or virtually any other desired manufacting operation. Welding processes suitably may include traditional welding or friction stir welding. A tool (such as one used for the bonding process) may be inserted through the slot 24 to access the work piece while the work piece is clamped on both sides of the slot 24. In this embodiment, clamping force is applied in a parallel with the slot 24 between the clamp bars 22.

FIG. 1B is an end elevational view of an single exemplary clamp bar 22 such as those used in the angled clamp bar assembly 20 of FIG. 1A. The spring-loaded pad 32 is attached to a keeper 30 which projects through a hole 26 through the clamp bar 22. The pad 32 is on the bottom of the clamp bar 22 (i.e. on the side towards the work piece when the assembly 20 is attached across the work piece). The pad 32 is spring-loaded against the work piece by the spring 36 installed in the counter-bored hole 27 in the bottom of the clamp bar 22. The keeper 30 retains the pad 32 and the spring 36 in place on the clamp bar 22, as described in greater detail in connection with FIG. 2 below. The spring 36 suitably applies a predetermined clamping pressure against the work piece.

It will be appreciated that various embodiments of the instant invention may include one or more clamp bars 22. A clamp bar assembly having a single clamp bar may suitably be used where, for example, clamping is only desired on one side of a joint or connection. Similarly, multiple clamp bars 22 in different configurations suitably provide clamping pressure over a wide range of configurations and surfaces. A pair of clamp bars 22 arranged close to each other with a slot 24 in between advantageously allow clamping pressure to be simultaneously applied to both sides of a joint line positioned under the slot 24.

FIG. 1C is a side elevational view of the exemplary angled clamp-bar assembly 20 shown in FIG. 1A. As is shown in this side view, each clamp bar 22 has two straight limbs 28 and a single central angle bend 29. At both ends 25 of the clamp bar 22 are the 90° angle stock forming the hold-downs 38. The hold-downs 38, at each end 25 of the clamp bars 22, are fastened to the clamp bars 22 by fasteners 39.

In this example configuration the clamp bar assembly 20 has eighteen spring-loaded pads 32 with eighteen keepers 30, nine of each on each clamp bar 22. Furthermore, in this embodiment, four pads 32 with four keepers 30 are on each limb 28 of the clamp bars 22 and one pad 32 and one keeper 30 is located at the bend 29 of the angled clamp bar 22. The pads 32 apply pressure to the work piece approximately perpendicular to the clamp bar 22 when the clamp bar 22 is held in place by the hold-downs 38 at each end. The pad 32 and keeper 30 at the bend 29 apply pressure against the work piece approximately parallel to a line that bisects the angle of the bend 29 of the clamp bar 22.

FIG. 1D is a partial top elevational view of an end of the angled clamp bar assembly 20 of FIG. 1A. Again, as viewed from the top, the two clamp bars 22 are separated by the slot 24. In this view of one end of the clamp bar assembly 20, two spring loaded pads 32 and their respective keepers 30 are on portions of the limb shown of the clamp bars 22 (the balance is cut off in this abbreviated top view of the end of the assembly 20). Attached to the ends 25 of the clamp bars 22 is the hold-down 38. The hold-down 38 is attached by fasteners 39 to the clamp bars 22. The two clamp bars 22 are held in position parallel to and separated from each other by the hold-down 38. The hold-down 38 has an opening 40, in this example in the form of a notch, that allows the assembly 20 to be bolted or attached to a frame or support (not shown) with the clamp bars 22 spanning a work piece.

Figure 2:
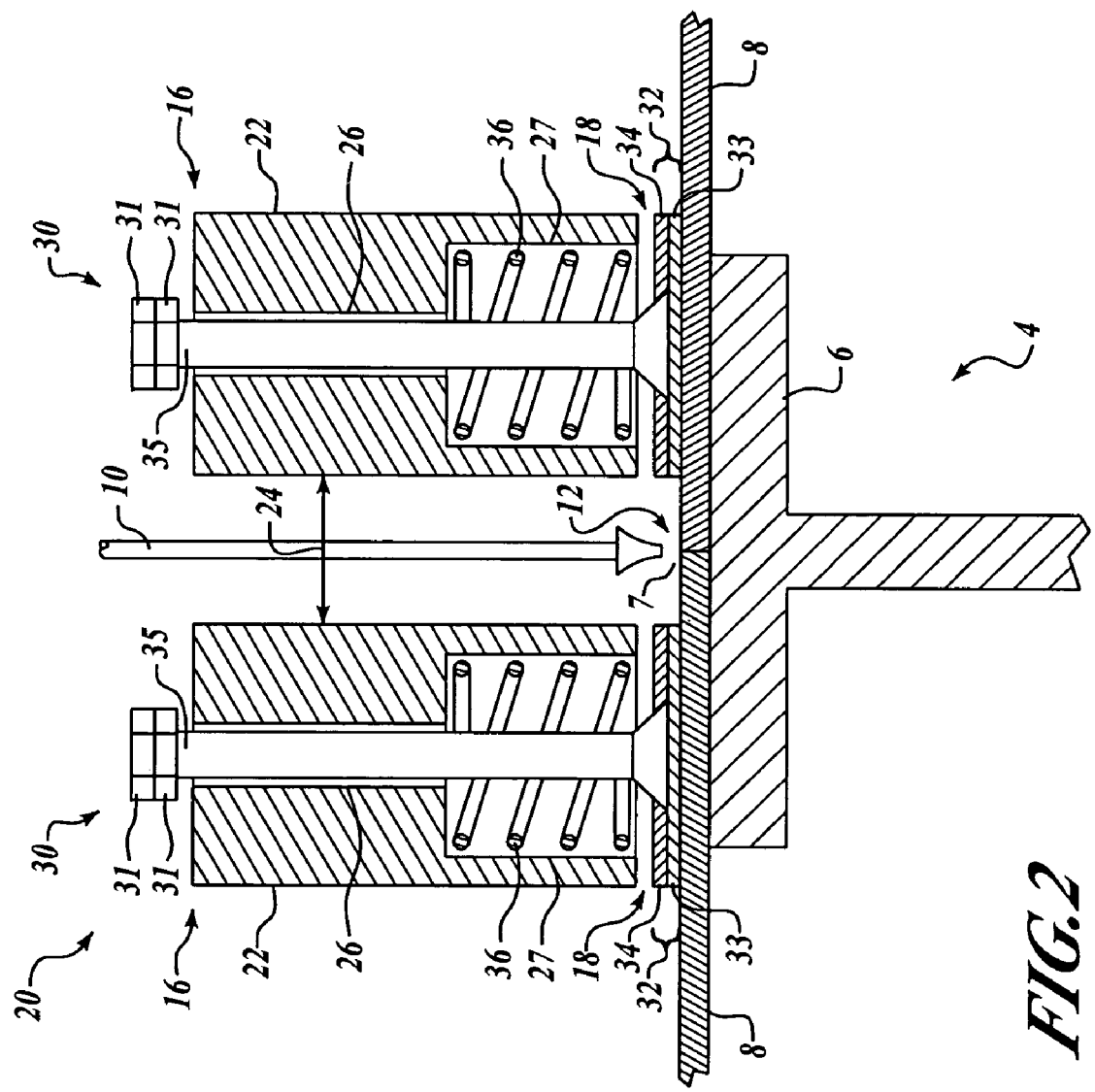
FIG. 2 is an end cross-sectional view of the clamp bar assembly of FIG. 1A in place on a work piece.

FIG. 2 is a cross sectional view of the clamp bar assembly 20 of FIGS. 1A through 1D in place on a work piece 4. The cross section in FIG. 2 is through the two clamp bars 22 at a location in each clamp bar 22 having a pad 32 and a keeper 30. Thus, the pad 32, keeper 30, and the spring 36 spring-loading the pad 32 are also shown in cross section.

As further shown in FIG. 2, the work piece 4 in this example includes the top of an I-beam frame 6 and two segments of skin (or panels) 8 to be installed in place and joined on the frame 6. The skin segments 8 preferably come together on top of the frame 6 at a joint 7 centered below the slot 24 of the clamp bar assembly 20. As described above, the slot 24 in the clamp bar assembly 20 allows a bonding tool 10 to be utilized to form a bond of the skin segments 8 to each other and, depending upon the application, to the underlying frame 6 at the joint 7.

In FIG. 2, the tool 10 may be a shouldered friction stir welding tool. Friction stir welding is a solid state joining process that is a combination of extruding and forging. A cylindrical shouldered tool with a profiled pin is rotated and slowly plunged into a joint line between pieces of material which are clamped together. Frictional heat is generated between the welding tool 10 and the work piece 4. The heat causes the work piece 4 to soften without reaching the melting point and allows the tool to traverse the joint 7 line. As it does, plasticized material is transferred from the leading edge of the tool 10 to the trailing edge of the tool 10 shoulder and pin. This leaves a solid phase bond along the work piece. While the clamp bar assembly 20 may be utilized to provide access to the joint 7 through the slot 24 for friction stir welding, it suitably may be used for any other welding process, bonding process, or manufacturing process. In operation, with the clamp bar assembly 20 centered with the slot 24 over the joint 7, the spring-loaded pads 32 hold the skin segments 8 hard against the underlying frame 6 on either side of the joint 7. The joint 7 can then be worked, welded, or bonded with the tool 10, using access through the slot 24 between the clamp bars 22. Access through the slot 24 spans the work piece, with parallel rows of clamping pads 32 on either side of the joint 7.

It will be appreciated that the pads 32 used to clamp the skin segments 8 may be attached with any suitable pressure applying device to the clamp bars 22 to provide a desired clamping pressure. In the representative clamp bar assembly 20 shown in FIG. 2, the pads 32 suitably include a pad 33 backed by a backing disc 34. The backing disc 34 is attached to a machine screw 35 which forms the keeper 30. The machine screw 35 projects from the bottom surface 18 of the clamp bar 22 to above the top surface 16 of the clamp bar 22 through a hole 26. The hole 26 is counter-bored from the bottom 18 with a counter-bore 27 providing space for a spring 36. The spring 36 applies clamping force via the pad 32 to the work piece 4. The counter-bore 27 may be counter-bored into the bottom 18 of each clamp bar 22 a suitable distance so that when the clamp bars 22 are held in place near the work piece 4, the springs 36 apply the desired amount of pressure to the work piece 4 via the pad 32.

A slippery or cushioning pad 33 may be used to cushion or prevent the scratching of the work piece 4 by the spring-loaded pad 32. In a preferred embodiment, the pad 33 may be TEFLON®. The pad 33 may be mounted to its backing disc 34 utilizing flush-mounted fasteners (not shown), including, for example, counter-sunk machine screws threaded into the metal backing disc 34. The pads 32 are suitably round, but may be any desired shape. The backing disc 34 for the pad 33 may have a hole at its center tapered to accept the head of the flathead machine screw 35. The machine screw 35 fits through the backing disc 34 forming a surface that is flush or flat, permitting the pad 33 to be installed over the backing disc 34 and the machine screw 35 forming a flat clamping surface for the spring-loaded pad 32. In a presently preferred embodiment, the machine screw 35 suitably may include a ¼-20×2½" flat-head machine screw. The backing disc 34 suitably includes a 1/16" steel disc, and the pad 33 suitably includes a 1/16" thick TEFLON® disc. The machine screw 35 forming the keeper 30 holding the pad 32 and spring 36 in place projects through the hole 26 in the clamp bar 22. In this exemplary embodiment, the hole 26 is suitably a ¼" hole.

By way of example but not limitation, in one representative embodiment, the two clamp bars 22 suitably are separated from each other by the slot 24 with a width of ¾", and the counter-bore 27 providing space for the springs may be 0.875" in diameter and 0.75" deep. Furthermore, in an exemplary embodiment, the clamp bars 22 themselves are suitably 1.75" tall and 1.125" wide. It will be appreciated that any suitable dimensions for the slot 24, pads 32, keeper 30, and the clamp bars 22 that provide access to the work piece and make provision for the keepers 30 to be moveably linked to the clamp bars 32 and apply clamping pressure to the work piece 4 may be utilized.

In yet another aspect of the embodiment shown in FIGS. 1A through 2, the machine screw 35 forming the keeper 30 is held from falling out of the clamp bars 32 with two jammed nuts 31, threaded on the machine screw 35 where the screw 35 projects through the top surface 16 of the clamp bar 22. The jam nuts 31 are suitably installed at the very top of the machine screw 35, above the top surface 16 of the clamp bar 22. The jam nuts 31 have a larger outside diameter than the hole 26 through the clamp bar 22 and thus hold the machine screw 35 in place. This retains the spring 36 and the pad 32 in place on the clamp bar 22 when the clamp bar is removed from the work piece 4. The spring 36 within the counter-bore 27 applys force from the clamp bar 22 to the pad 32 against the work piece 4. The machine screw 35 included in the keeper 30 is suitably long enough to project through the clamp bar 22 and be held by the jam nuts 31 while giving sufficient clearance for the pad 32 to be spring-loaded by the spring 36 away from bottom 18 of the clamp bar 22.

The spring (or pressure applying device) 36 suitably provides clamping pressure to the work piece 4. In a preferred embodiment, the springs 36 may be Danley Die Springs # 9-1204-36. With the clamp bar assembly 20 installed in place spanning the work piece 4, the die springs 36 can suitably apply a force of approximately 228 lbs each against the work piece 4. It will be appreciated that the springs 36 may be shimmed, or the counter-bore 27 depths varied, to provide varying degrees of clamping force where, for example, additional or varying clamping force is desired, or to provide for equal clamping pressure across the entire span of the clamp bars 22. This suitably may compensate for deflection when the clamp bar assembly 20 is held against a work piece 4 with the spring-loaded pads 32 engaging and clamping the work piece 4.

The pressure applying devices 36 applying clamping pressure to the work piece 4 via the pads 32 suitably may include any type of pressure applying device other than springs 36, such as resilient materials, hydraulic pistons, pneumatic bladders, or any other suitable pressure applying device. A resilient material may include, for example, a soft plastic or rubber material. It will be appreciated that springs 36, even without further shimming, provide relatively even pressure when several spring-loaded pads 32 project from the clamp bars 22 spanning a work piece 4. As the clamp bar assembly 20 is held against the work piece (or vice versa) 4 with the bars 22 spanning the work piece 4, the springs 36 are placed in compression applying clamping force against the work piece 4 on both sides of the joint 7 being worked on. It will be appreciated the jam nuts 31 keep the keeper 30 in place when the assembly 20 is removed from the work piece 4.

Figure 3:
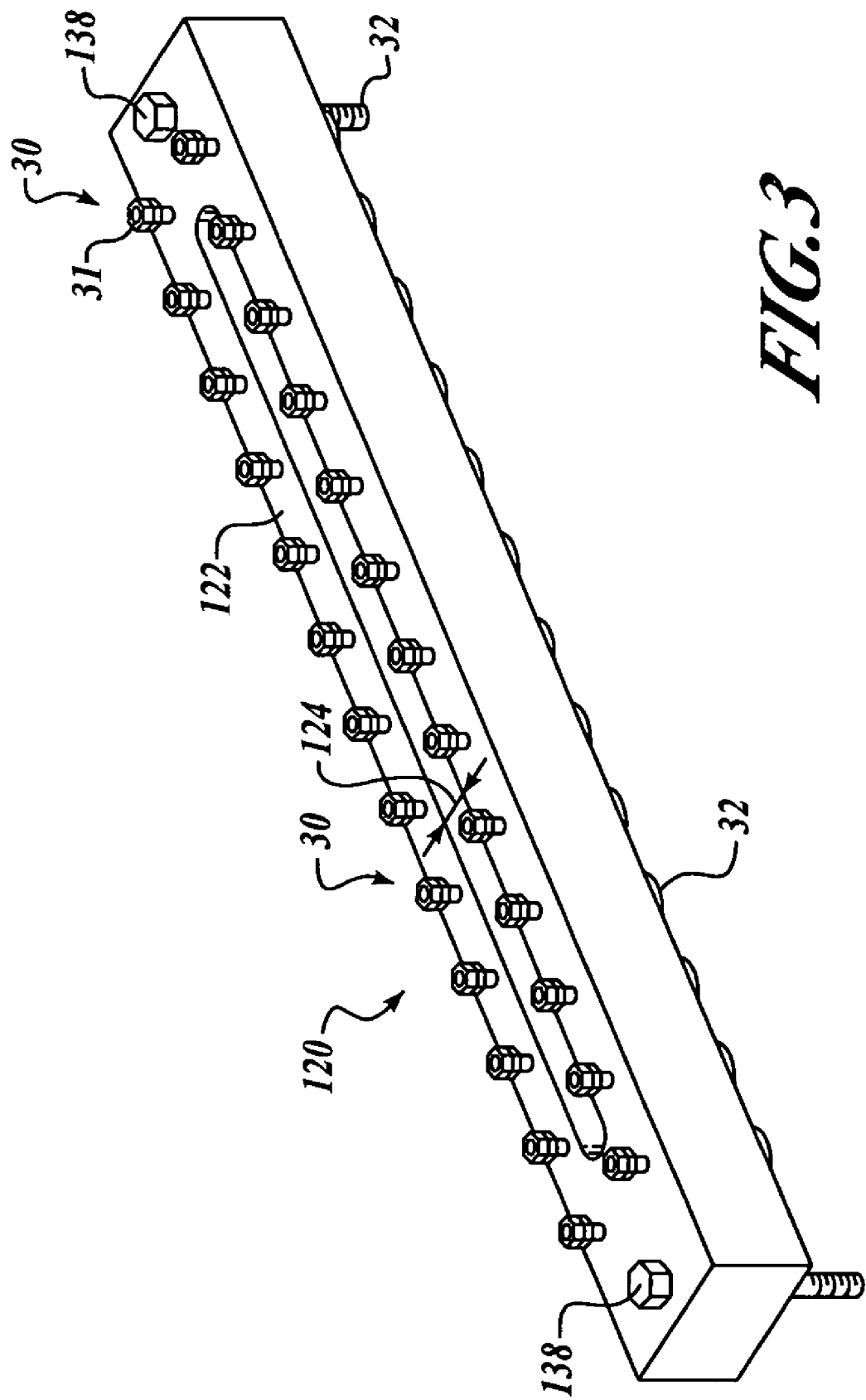
FIG. 3 is an isometric view of a straight clamp bar assembly in accordance with an alternate embodiment of the present invention.

Turning to FIG. 3, it will be appreciated that a clamp bar assembly 120 in accordance with an embodiment of the present invention may be fabricated using a single spanning or elongated member 122. In the example embodiment shown in FIG. 3, the spanning member 122 has a slot 124 formed through it lengthwise, for access to a work piece (not shown). The spanning member 122 suitably may be manufactured from a single bar of steel with the slot 124 cut through the bar. The slot 124 is cut through the bar along its length, but not all the way through to the ends, leaving it as one piece. At the ends (or at one or more locations, see FIG. 8 below), the spanning member 122 may be suitably bolted to a tower or attachment over a work piece (not shown) with the use of fastening bolts 138. In this embodiment, the two clamp bars 22, and the two hold-downs 38 of FIG. 1A are combined into a single integral component spanning member 122 of FIG. 3, with the cut slot 124 longitudinally cut through the spanning member 122.

In the embodiment shown in FIG. 3, a straight clamp bar assembly 120 is suitably formed by the straight spanning member 122. As with other configurations of the present invention, the spanning member 122 suitably may be angled, segmented, or curved to conform to the surface of the work piece (not shown) being clamped. The embodiment shown in FIG. 3 is straight for use in clamping a flat work piece (not shown).

As in the angled clamp bar assembly 20 of FIGS. 1A–1D, the straight clamp bar assembly 120 of FIG. 3 includes two parallel rows of spring-loaded pads 32 disposed on opposite sides of the slot 124. The slot 124 suitably provides access to a joint or elongated work area underneath the assembly 120, when the assembly 120 is in place over a work piece. The assembly 120, through its pads 32, may suitably apply pressure on two sides of a joint centered underneath the slot 124 in the spanning member 122 when the spanning member 122 is attached in place or held against a work piece. The pads 32 may be held in place by keepers 30 projecting through the spanning member 22 in the manner described above with reference to FIG. 2.

It will be appreciated that the clamp bar assembly 120 of the present invention may be held in place against a work piece, or the work piece may be pushed against the assembly 120 by a jig, lift, or other assembly. Put differently, clamping force can be applied by holding the assembly 120 against the work piece, or by holding the work piece against the assembly 120.

Figure 4:
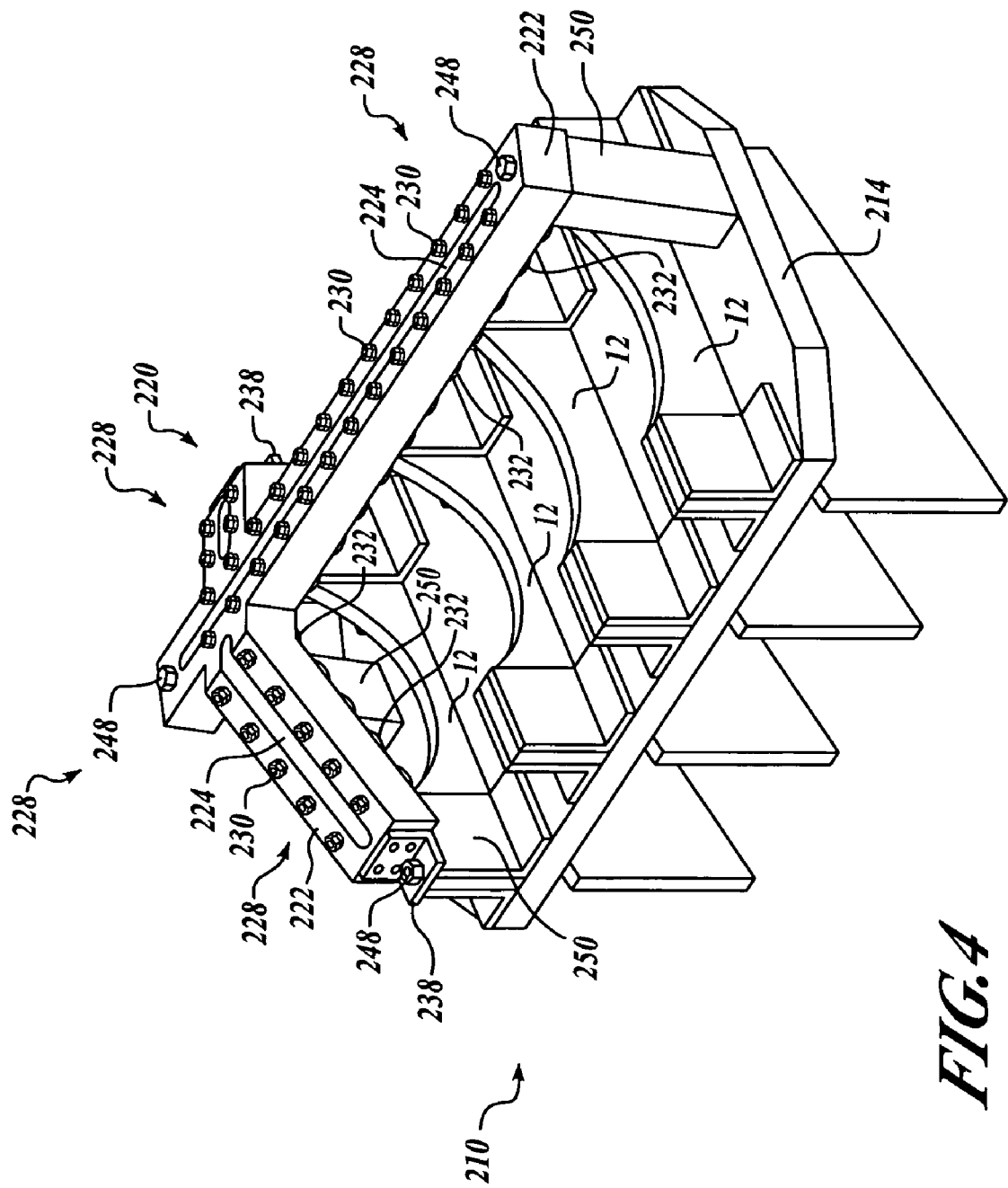
FIG. 4 is an isometric view of an assembly jig incorporating a cruciform clamp bar assembly in accordance with yet another embodiment of the present invention.

FIG. 4 shows another exemplary embodiment of the present invention including an assembly jig 210 for an aircraft segment. The assembly jig 210 suitably includes a base 214 with a plurality of supports or cradles 12 for holding the frame for a fuselage segment (not shown). Attached to the base 214 are a plurality of towers 250 to which are attached a clamp bar assembly 220 of the present invention. In this example embodiment, the clamp bar assembly 220 is approximately cruciform shaped. The clamp bar assembly 220 includes four limbs 228 intersecting at 90° in a cross shape bridging over a work piece (not shown) when the work piece is held in place on the cradles 12 of the jig 210. The clamp bar assembly 220 thus has four pairs of rows of spring-loaded pads 232 held in place by keepers 230. Each limb 228 of the cruciform shaped clamp bar assembly 220 has a slot 224 centered in the limb 228 and extending longitudinally along the limb 228. Each slot 224 allows access to the work piece when the assembly 220 is in place on the jig 210 for welding, bonding, or other manufacturing work.

As further shown in FIG. 4, in this embodiment, three of the limbs of the cruciform shaped clamp bar assembly 220 are co-planar while a fourth limb is bent at an angle away from the plane of the other limbs. The clamp bar assembly 220 thus may apply clamping force along an intersecting pair of joints in the work piece, including across an angled three-dimensional surface of the work piece.

The clamp bar assembly 220 is held over the top of the cradles 12 by fasteners 248 to towers 250 attached to the base 214. Two of the limbs of the cruciform shaped clamp bar assembly 220 are held to the towers 250 by angle bar hold-downs 238, while two other limbs of the assembly 220 are held in place with fasteners 248 through the clamp bars 222. It will be appreciated that any suitable combination of attachments between the clamp bar assembly 220 and the towers 250 holding the clamp bar assembly 220 to the jig 210 may be utilized. It will also be appreciated that the clamp bar assembly 220 may be fixedly mounted (e.g. to a floor or other suitable support structure), and a work piece on moveable supports or cradles 12 may be moved underneath or alongside the clamp bar assembly 220 and pushed against the clamp bar assembly 220 with a suitable mechanism resulting in a clamping force being applied to the work piece. The assembly jig 210 of FIG. 4 may be configured with a variety of clamp bar assemblies 220 to quickly and efficiently allow manufacturing operations, including bonding work such as welding or friction stir welding, to be completed on complex shaped equipment and equipment sections. This may include bonding work traversing a variety of contours, as well as multiple segments intersecting at different angles as required for the assembly of the work piece.

Embodiments of the present invention may also suitably includes the methods of clamping work pieces, and working work pieces, in the manner described in connection with FIGS. 1–4 above. Embodiments of methods in accordance with the present invention may permit uniform application of clamping force across a work piece, and working the work piece along side or between the clamping mechanism(s) of the present invention.

Figure 5:
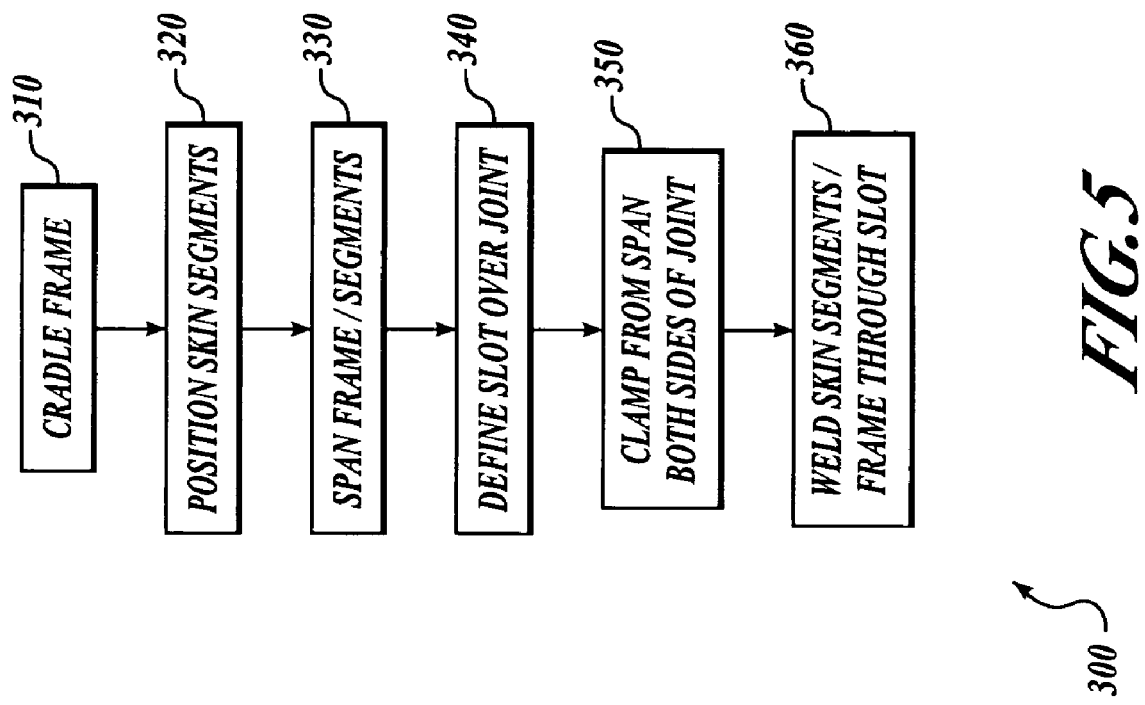
FIG. 5 is a flow chart of an exemplary assembly method in accordance with yet another embodiment of the present invention.

FIG. 5 illustrates an exemplary process 300 of performing a manufacturing process (e.g. friction stir welding) on a pair of skin segments of a portion of an aircraft frame in accordance with yet another embodiment of the present invention. The method 300 may begin at a block 310, in which a portion of a support frame is cradled. Cradling the support frame may include placing the frame within an assembly jig, such as the assembly jig described above in connection with FIG. 4. At a block 320, at least one skin segment is positioned over the frame. It will be appreciated that, as in FIG. 2, at the block 320, two adjoining skin segments may be butted together along the top of the support frame.

As further shown in FIG. 5, at a block 330, at least part of the portion of the frame and the at least one skin segment are bridged forming a span from which clamping pressure can be applied. The span can be a single span, permitting work to be done on the work piece on either side of that span, or the span can include two parallel spans, permitting working of the work piece in a slot between the spans such as shown and described above in connection with FIG. 2. The span may completely bridge the work piece, may be along side the work piece as described in connection with FIGS. 6 and 7 below, and may be cantilevered over the workpiece as described in connection with FIG. 8 below. In embodiments where two parallel spans are utilized, at a block 340, the method 300 may include defining a slot over a joint on the work piece to be worked. In this exemplary embodiment, the joint suitably includes two butted skin segments over a frame member of an aircraft, positioned in the manner as described above in connection with FIG. 2.

With continued reference to FIG. 5, in this embodiment, at a block 350 both sides of the joint are clamped. The slot or opening defined by the spans permits the work piece to be worked on between the clamped areas. At a block 360, a manufacturing operation may be performed on the work piece (e.g. welding). Suitably, in one embodiment of the method 300, the two abutting skin segments positioned over the frame member of a portion of the frame of the aircraft may be friction stir welded by inserting a tool through the slot in the span, while the skin segments on both sides of the joint may be securely clamped in the manner described above using apparatus in accordance with embodiments of the present invention. Thus, it will be appreciated that the method 300 may advantageously facilitate the secure and rapid clamping and working of a work piece, even when performing a manufacturing operation on the work piece involves the application of substantial force, such as in friction stir welding.

Figure 6:
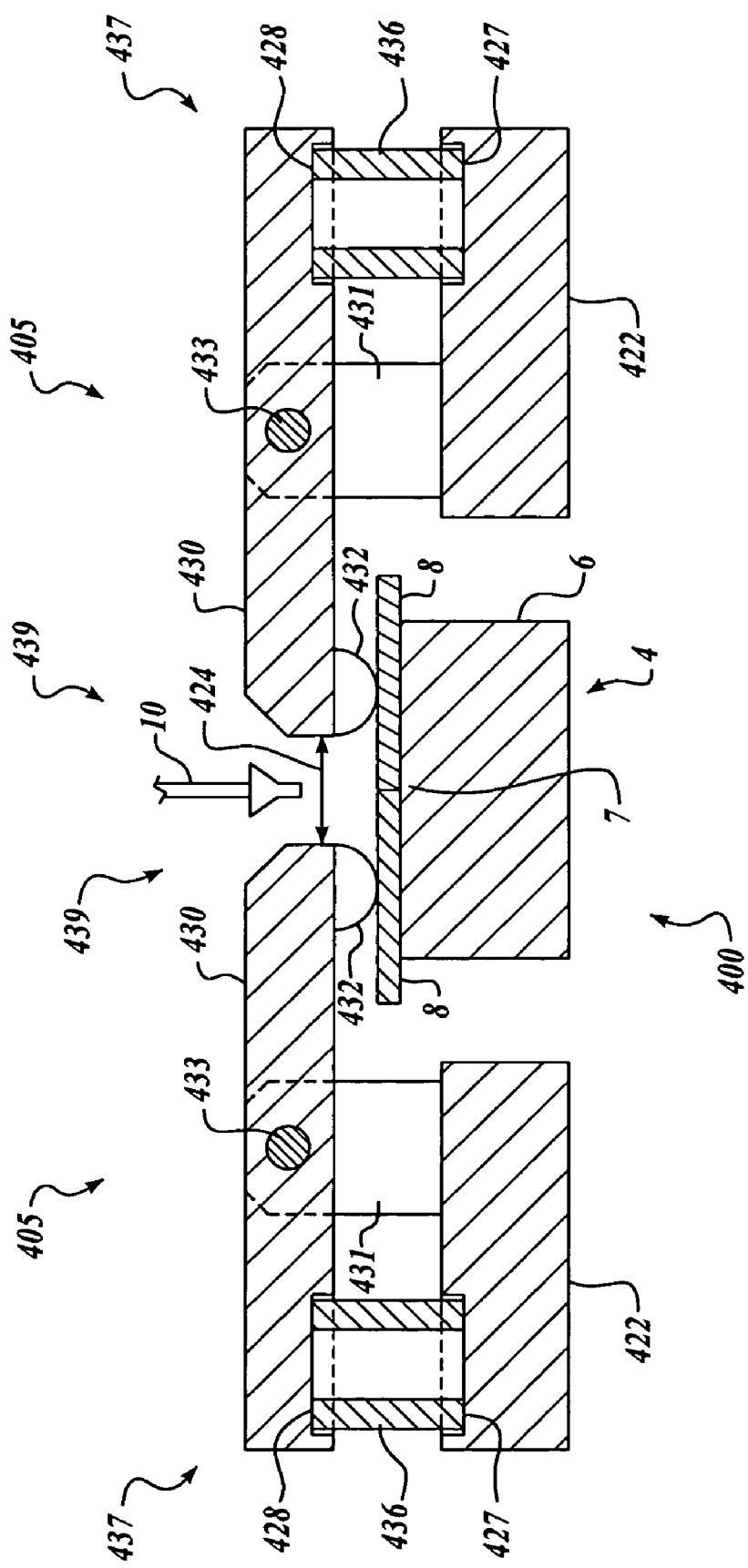
FIG. 6 is an end elevational view of an offset clamp bar assembly in place on a work piece.

Turning to FIG. 6, it will be appreciated that clamping force may be resiliently applied from along side a work piece 4. FIG. 6 is an end elevational view of an exemplary clamp assembly 400 with keepers 405 that extend laterally over a work piece, transmitting clamping force from clamp bars 422 along side the work piece 4. The work piece 4 includes a frame member 6, and two covering skin sections 8, to be joined together at a joint 7 over the frame member 6. A clamp bar 422 is positioned on each side of the work piece 4. Attached to the clamp bars 422 are keepers 430, mounted on supports 431 with fulcrums 433 attached to the clamp bars 422. The keepers 430 form a lever arm projecting across the fulcrums 433 out over the the work piece 4, in this embodiment from two clamp bars, one on each side of the work piece 4. The keepers 430, in this exemplary embodiment, are resiliently biased by springs 436 between their first ends 437 situated over the clamp bars 422, and the clamp bars 422. The springs 436 thus bias the keepers' 430 second ends 439, which project over the work piece 4, hard against the work piece 4, applying clamping force to the work piece 4. In this embodiment, the fulcrums 433 are pivots linking the keepers 430 to the supports 431, permitting force from the springs 436 applied to the first ends 437 of the keepers 430 to be transmitted to the work piece 4 by the opposite second ends 439 of the keepers 430.

The springs 436 are suitably held in place in position between the clamp bars 422 and the first ends 437 of the keepers within counterbores 427 and 428 in the clamp bars 422 and keepers 430, respectively. The ends of the springs 437 nest within the counterbores 427 and 428. In this embodiment, the second ends 439 of the keepers 430, over the work piece 4, have pads 432, that apply the clamping force to the work piece 4.

The clamp assembly 400 applies clamping force from both sides of the work piece 4. A distance or slot 424 between opposing second ends 439 of the keepers 430 projecting over the work piece 4 allows the work piece 4 to be worked along the joint 7 without interference from the assembly 400. The distance or slot 424 between the keepers 430 allows a working tool 10 to be moved along the joint 7, between the pads 432 applying clamping force.

Figure 7:
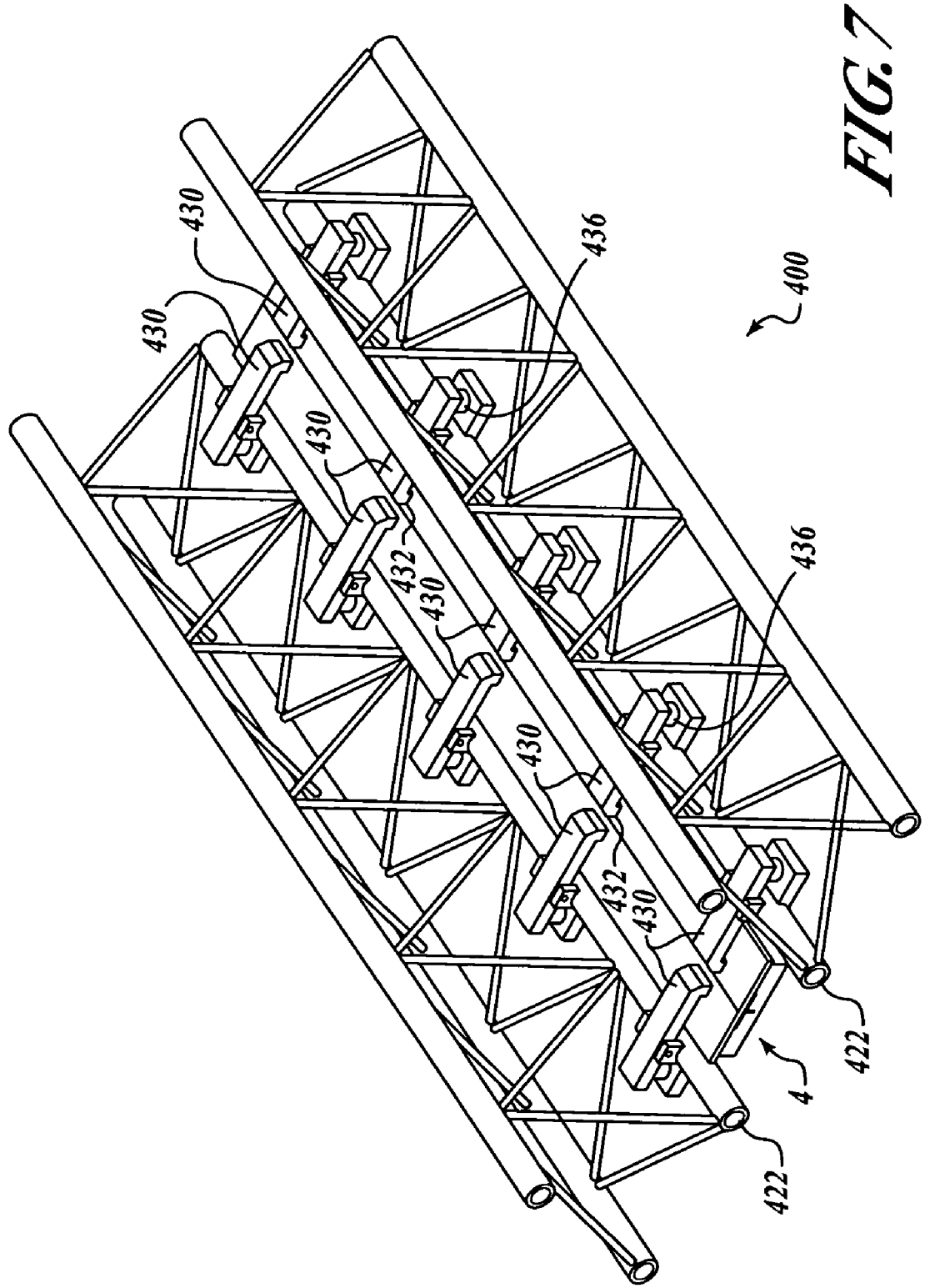
FIG. 7 is an isometric view of the offset clamp bar assembly of FIG. 6 in place on a work piece.

As shown in FIG. 7, the clamp bars 422 of FIG. 6 may be of any suitable configuration positionable along side the work piece 4. FIG. 7 is an isometric view of the clamp bar assembly 400 of FIG. 6 in position over a work piece. The assembly 400 iincludes a plurality of keepers 430 that project over the work 4 from both sides. The keepers 430 apply resilient clamping force to the work piece 4 in the manner described with respect to FIG. 6. The clamp bars 422 are suitably elongated triangular trusses that form a support for the keepers 430. Two clamp bars 422 are positioned one on each side of the work piece 4, each with a plurality of keepers 430 projecting over the work piece 4. The clamp bars 422 suitably provide sufficient moment resistance when positioned along side the work piece 4 to compress the springs 436 resulting in clamping force being applied to the work piece by the keepers 430, and their attached pads 432.

It will be appreciated that a clamp assembly of the present invention may be positioned with respect to a work piece in a range of configurations. In FIG. 8, an exemplary clamp assembly 500 is cantilevered over a work piece 4. As in FIG. 3, an elongated clamp bar 522 has a longitudinal slot 524 cut through the bar 522. On each side of the slot 524 are a plurality of spring-loaded keepers 530 projecting though the bar 522. The spring-loaded keepers retain springs (not shown) that apply clamping force biasing pads 532 against the work piece 4. In this embodiment the clamp bar 522 is attached to a base 502 at one end 523, while the opposite end 525, with the slot 524 and the plurality of spring loaded keepers 530 projects over the work piece. The base 502 is attached to a foundation surface 501 that also supports the work piece 4. It will be appreciated that cantilevering the clamp bar 522 from a base 502 may allow the work piece 4 to be slid or moved in underneath the clamp bar 522, without detaching the clamp bar 522 from the base 502.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An apparatus for applying a clamping force against a surface of a work piece, the apparatus comprising:

first and second substantially straight elongated members, the elongated members being approximately parallel and spaced apart to define an elongated slot therebetween, the elongated members being further adapted to be positioned proximate the surface of the work piece and further adapted to be secured to substantially prevent movement of the elongated members relative to the surface; and a plurality of pressure applying devices operatively attached to the first and second substantially straight elongated members and disposed therealong, each pressure applying device including a contact member moveable relative to an associated one of the first and second elongated members and adapted to engage the surface of the work piece, and a resilient member operatively coupled between the contact member and to the associated one of the first and second elongated members, the resilient member biasing the contact member away from the elongated member to apply a clamping force to the surface of the work piece.

2. The apparatus of claim 1 wherein at least one of the elongated members includes a first end portion and a second end portion adapted to be secured to substantially prevent movement of the elongated member relative to the surface.

3. The apparatus of claim 1 wherein at least one of the elongated members includes a first end portion and a second end portion adapted to be secured to an adjacent structure so that the elongated member extends across the surface of the workpiece to substantially prevent movement of the elongated member relative to the surface.

4. The apparatus of claim 1 wherein the resilient member includes at least one of a spring and a resilient material.

5. The apparatus of claim 4 wherein the resilient material includes at least one of a rubber and a compressible plastic.

6. The apparatus of claim 1, wherein at least one pressure applying device applies at least one of a hydraulic pressure and a pneumatic pressure.

7. The apparatus of claim 1, wherein the at least one elongated member includes a substantially straight segment.

8. The apparatus of claim 1, wherein the at least one elongated member includes a curved segment.

9. The apparatus of claim 1, wherein the elongated member includes a segment including an angle.

10. The apparatus of claim 1, wherein the contact member includes at least one pad arranged to apply the clamping force against the surface.

11. The apparatus of claim 10, wherein the at least one pad includes a TEFLON® layer.

12. The apparatus of claim 1, wherein the plurality of pressure applying devices includes a plurality of resiliently loaded pads attached along a span of the elongated member over the surface and arranged to apply the clamping force to the surface at a plurality of locations.

13. The apparatus of claim 1, further comprising third and fourth substantially straight elongated members coupled to the first and second elongated members, respectively, the third and fourth elongated members being approximately parallel and spaced apart to define a second elongated slot therebetween, the third and fourth elongated members being further adapted to be positioned proximate the surface of the work piece, and further adapted to be secured to substantially prevent movement of the elongated members relative to the surface; and
 a plurality of second pressure applying devices operatively attached to the third and fourth substantially straight elongated members and disposed therealong, each second pressure applying device including a second contact member moveable relative to an associated one of the third and fourth elongated members and adapted to engage the surface of the work piece, and a second resilient member operatively coupled between the second contact member and to the associated one of the third and fourth elongated members, the second resilient member biasing the second contact member away from the elongated member to apply a second clamping force to the surface of the work piece.

14. The apparatus of claim 13, wherein the third and fourth elongated members are coupled to the first and second elongated members to form an angular assembly.

15. The apparatus of claim 14, wherein the third and fourth elongated members are coupled to the first and second elongated members to form a cruciform shape.

16. An apparatus for applying a clamping force against a surface of a work piece, the apparatus comprising:
 an elongated member adapted to be bridged across the surface of the work piece, the elongated member adapted to be secured to substantially prevent movement of the elongated member relative to the surface;
 the elongated member defining a slot with a first side and a second side, the elongated member including a first portion and a second portion on first side and the second side of the slot, respectively; and
 a plurality of pressure applying devices distributed along the first and second portions, each pressure applying device being moveably coupled to a respective one of the first and second portions and including a contact member moveable relative to the respective one of the first and second portions and adapted to engage the surface of the work piece, and a resilient member operatively coupled between the contact member and to the respective one of the first and second portions, the resilient member biasing the contact member away from the respective one of the first and second portions to apply a clamping force to the surface of the work piece.

17. The apparatus of claim 16, wherein at least one of the pressure applying devices includes a spring.

18. The apparatus of claim 16, wherein at least one of the resilient members includes a resilient material.

19. The apparatus of claim 18 wherein the resilient material includes one of rubber and compressible plastic.

20. The apparatus of claim 16 wherein the at least one of the resilient members applies the clamping force utilizing one of hydraulic pressure and pneumatic pressure.

21. The apparatus of claim 16 wherein the first portion includes a first substantially straight segment, and the second portion includes a second substantially straight segment, and the first substantially straight segment being positioned proximate and parallel to the second substantially straight segment, and wherein the plurality of pressure-applying devices are coupled to the first and second substantially straight segments.

22. The apparatus of claim 16 wherein the elongated member includes a curved segment.

23. The apparatus of claim 16 wherein the elongated member includes an angled segment.

24. The apparatus of claim 16 wherein the at least one of the contact members includes at least one pad arranged to distribute the clamping force against the object.

25. The apparatus of claim 16 wherein the at least one pad includes a TEFLON® layer.

26. The apparatus of claim 16, wherein the elongated member includes a first end portion and a second end portion adapted to be secured to an adjacent structure to substantially prevent movement of the elongated member relative to the surface.

27. The apparatus of claim 16 wherein the slot includes a plurality of intersecting limbs.

28. The apparatus of claim 26, wherein the slot in plan view defines a cruciform shape.

29. An apparatus for clamping a work piece during a manufacturing process, the apparatus comprising:
 a first elongated member adapted to be positioned proximate a surface of the work piece, the first elongated member including at least one portion adapted to be secured to substantially prevent movement of the first elongated member relative to the surface;
 a second elongated member adapted to be positioned approximately parallel with and spaced apart from the first elongated member and forming an elongated slot therebetween, the second elongated member being adapted to be secured to substantially prevent movement of the second elongated member relative to the surface; and
 a first plurality of pressure applying devices operatively attached to the first elongated member a second plurality of pressure applying devices operatively attached to the second elongated member, each pressure applying device including a contact member moveable relative to an associated one of the elongated members and adapted to engage the surface of the work piece, and a resilient member operatively coupled between the contact member and the associated one of the elongated members the resilient member biasing the contact member to apply a clamping force to the surface of the work piece.

30. The apparatus of claim 29 wherein the resilient member includes a spring.

31. The apparatus of claim 30 wherein the resilient member includes a resilient material.

32. The apparatus of claim 30 wherein the contact member is adapted to project across at least a portion of the surface of the work piece.

33. An apparatus for clamping a skin to a frame during a manufacturing process, the apparatus comprising:
    at least one cradle adapted to support the frame;
    at least one elongated member adapted to be positioned to bridge the frame, the elongated member having a slot formed therein and adapted to provide access to the skin during the manufacturing process, the at least one elongated member including first and second end portions adapted to be secured to substantially prevent movement of the elongated member relative to the frame; and
    a plurality of pressure applying devices operatively attached to the at least one elongated member and disposed therealong, each pressure applying device including a contact member moveable relative to the elongated member and adapted to engage the surface of the work piece, and a resilient member operatively coupled to the contact member and to the elongated member, the resilient member biasing the contact member away from the elongated member to apply a clamping force to the skin holding, the skin against the frame during the manufacturing process.

34. The apparatus of claim 33 wherein the resilient member includes a spring.

35. The apparatus of claim 33 wherein the resilient member includes a resilient material.

36. The apparatus of claim 33, wherein at least one of the plurality of pressure applying devices applies at least one of a hydraulic pressure and a pneumatic pressure.

37. The apparatus of claim 33, wherein the at least one elongated member includes first and second elongated portions.

38. The apparatus of claim 37, wherein the first and second elongated portions comprises non-parallel elongated portions.

39. The apparatus of claim 38, wherein the first and second elongated portions comprise a cruciform shape.

* * * * *